No. 873,260. PATENTED DEC. 10, 1907.
G. NOLL.
COMPOST DIGGER AND ELEVATOR.
APPLICATION FILED AUG. 8, 1907.
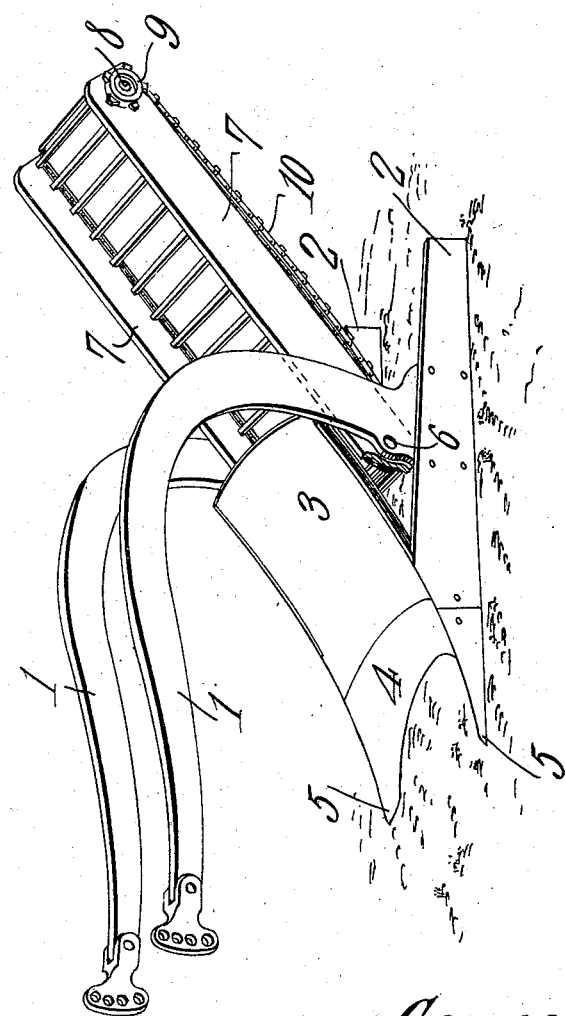
George Noll,
Inventor.
Witnesses
By C. A. Snow & Co.
Attorneys

UNITED STATES PATENT OFFICE.

GEORGE NOLL, OF WINCHESTER, KANSAS.

COMPOST DIGGER AND ELEVATOR.

No. 873,260.  Specification of Letters Patent.  Patented Dec. 10, 1907.

Application filed August 8, 1907. Serial No. 387,725.

*To all whom it may concern:*

Be it known that I, GEORGE NOLL, a citizen of the United States, residing at Winchester, in the county of Jefferson and State of Kansas, have invented a new and useful Compost Digger and Elevator, of which the following is a specification.

This invention has relation to compost diggers and elevators and it consists in the novel construction and arrangement of its parts as hereinafter shown and described.

The object of the invention is to provide a digger and elevator of the character indicated which may be attached to a spreader or wagon and which is adapted to dig the compost and elevate the same and deposit it in the body of the spreader or wagon.

The digger and spreader consist primarily of a pair of spaced beams to the lower end of each of which is attached a land side plate and between which is located a concaved mold board common to both. A double pointed share is located in advance of the mold board and the points of the said share are located at opposite edges thereof and in alinement with the land side plates carried by the beams. A chain belt conveyer is located behind the mold board with its lower portion between the beams and its upper portion above the beams, said conveyer being provided with side boards which are adapted to prevent the material from falling from the edges of the conveyer after it has been deposited upon the same.

In the accompanying drawing:—The figure is a perspective view of the digger and elevator.

The digger and elevator consists of a pair of beams 1, 1 which are spaced apart. The said beams are adapted to be attached by any suitable means to a spreader or wagon. Each beam is provided at its lower end with a land side plate 2 and the concaved mold board 3 is located above the said land side plates and is connected at its edges with both of the said beams. A double pointed share 4 is located in advance of the mold board 3. The points 5 of the said share are in alinement with the land side plate 2. The shaft 6 is journaled for rotation between the beams 1 and below the upper edge of the mold board 3. The side boards 7 are attached to the beam 1 and are upwardly and rearwardly inclined. The shaft 8 is journaled for rotation between the upper ends of the said boards 7 and is provided with a sprocket wheel 9 or other means whereby it may be rotated. The chain belt conveyer 10 passes around the shafts 6 and 8 and the upper portion of the said conveyer moves longitudinally between the side boards 7.

From the foregoing description it is obvious that as the attachment is moved along the ground the share 4 and the points 5 thereof will cut and dig the compost which is shunted in an upward direction upon the concaved mold board 3. From the upper edge of said mold board the material falls upon the chain belt conveyer 10 which is operated by any suitable means (not shown) and the material is carried up by the said conveyer to the upper end thereof from which point it falls into the body of the spreader or the wagon.

Having described my invention what I claim as new and desire to secure by Letters-Patent is:—

An implement as described comprising beams, land side plates attached to the outer sides of the rear ends of the beams, a conveyer located between the beams and being attached to the inner sides thereof, a plow share attached to the landside plate and a concaved mold board attached to the landside plates and having its rear end lying between the beams and over the conveyer.

In testimony that I claim the foregoing as my own, I have hereto affixed my signature in the presence of two witnesses.

GEORGE NOLL.

Witnesses:
JAMES FAIRHURST,
J. H. WILHELM.